Jan. 15, 1963 D. S. STRADER 3,073,332
PRESSURE OPERATED RECIPROCATING HYDRAULIC VALVE
Original Filed May 28, 1959

Inventor:
Don S. Strader
Paul O. Pippel
Atty.

United States Patent Office 3,073,332
Patented Jan. 15, 1963

3,073,332
PRESSURE OPERATED RECIPROCATING HYDRAULIC VALVE
Don S. Strader, Mount Prospect, Ill.,
Original application May 28, 1959, Ser. No. 816,513. Divided and this application Sept. 12, 1960, Ser. No. 55,309
8 Claims. (Cl. 137—112)

This invention relates generally to hydraulic fluid distributing valves, and more specifically to a certain hydraulic fluid valve construction which automatically operates to distribute hydraulic fluid therethrough dependent upon certain hydraulic fluid pressures applied to the ports of the valve. This invention is a division of the pending application of Ralph L. Beyerstedt et al., Serial No. 816,513, filed May 28, 1959 for Tractor Loaders.

This invention, which is particularly useful in tractor loader structures and arrangements such as described in the above noted application, has for its principal object, the provision of an automatic distributing valve for hydraulic fluid circuits.

Another object of the present invention is to provide a hydraulic valve construction wherein the valve will automatically operate responsive to certain fluid pressures applied to one of the ports of the valve to direct fluid through the valve in various directions.

It is a further object of the present invention to provide a hydraulic fluid valve operating responsive to hydraulic fluid pressures at either of two ports thereof for directing fluid flow therethrough in certain paths dependent upon the applied fluid pressures and the specific port of the valve to which those fluid pressures are applied.

Figure 1:
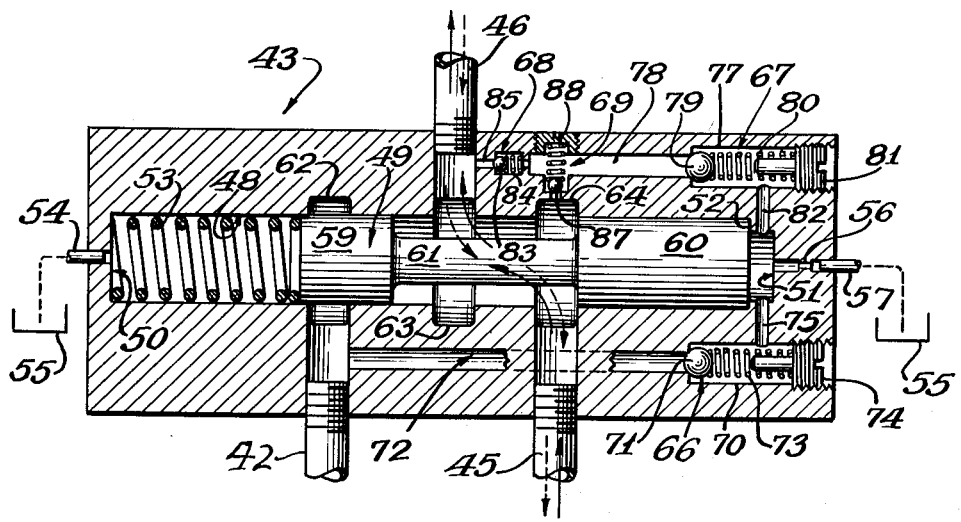
Figure 2:
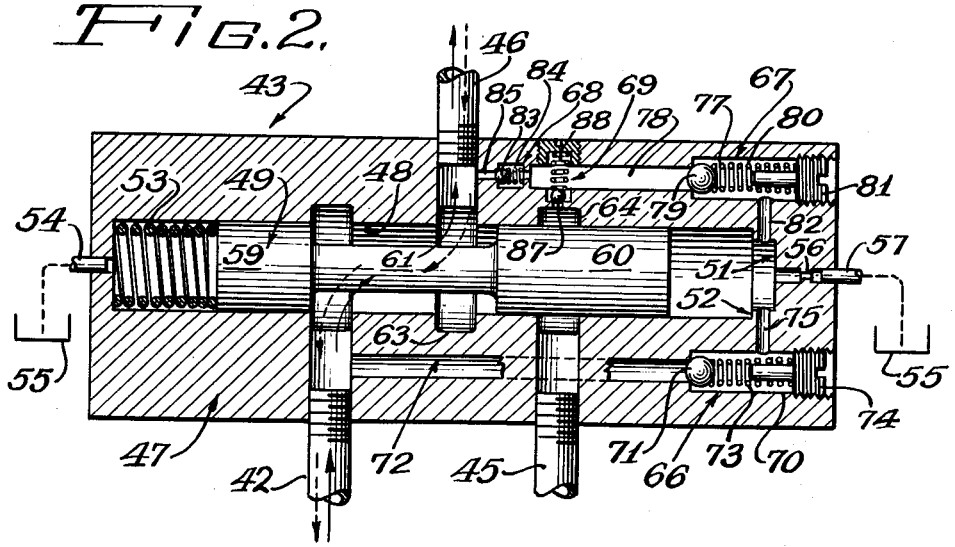

Other objects and features of the present invention will be apparent upon a perusal of the following specification and drawing of which:

FIG. 1 is a somewhat diagrammatic cross-sectional view of the valve of the subject invention in one operated position thereof; and FIG. 2 is a view similar to FIG. 1, but with the valve in another operated position.

The present embodiment is the preferred embodiment, but it is to be understood that changes can be made in the present embodiment by one skilled in the art without departing from the spirit and scope of the present invention.

For a general description of the present invention reference is made to the drawing. The valve of the present invention is provided with three ports respectively having conduits 42, 45 and 46 connected thereto. The valve comprises a certain spool arrangement with a number of check valves which in combination with the ports produce the desirable results of the present invention. In one operating arrangement of the valve, hydraulic fluid of a relatively low pressure is directed as shown by the solid lines in FIG. 1 from conduit 45 through the valve and into conduit 46. Under this condition conduit 42 is connected to some fluid operated means wherein the pressure may rise substantially higher than that flowing through conduits 45 and 46. When the pressure in the port connected to conduit 42 reaches a certain predetermined value, the spool 49 will shift to the left as shown in FIG. 1 to the position shown in FIG. 2. The fluid in conduit 42 then flows through the valve and into conduit 46. The valve will also operate under the conditions as shown by the dotted lines in FIG. 1. In this arrangement the hydraulic fluid enters the valve from conduit 46 and flows through the valve into conduit 45. When the fluid pressure in the ports connected to conduit 45 or conduit 46 reaches a certain predetermined value, the valve automatically operates to shift the spool 49 to the position shown in FIG. 2 and the hydraulic fluid will then flow from conduit 46 through the valve and into conduit 42.

For a detailed description of the present invention continued reference is made to the drawing. The valve 43, which is shown in its two operated positions in FIGS. 1 and 2, is shown somewhat diagrammatically therein. The valve housing or body 47 is provided with a valve bore 48 in which a valve spool 49 is slidably carried. One end of the valve bore 48 is closed by a wall 50 and the other end thereof is closed by a wall 51. A reduced annular section or shoulder 52 is provided in the valve bore 48 adjacent the end wall 51, and the shoulder 52 in abutting one end of the valve spool 49 determines one operated valve position of the valve 43. A compressed coiled spring 53 is provided in the other end of the valve bore 48 between the end wall 50 and the other end of the valve spool 49 to bias the valve spool 49 against the shoulder 52. End wall 50 is provided with a conduit 54 connected therethrough and to the reservoir designated with the numeral 55 to drain any fluid accumulations from the chamber defined by the end wall 50 and the cooperating end of the valve spool 49. The end wall 51 is also provided with an opening therethrough, however, an orifice 56 is formed in this opening. The orifice 56 is of a size sufficiently small to permit the development of fluid pressures in the chamber defined by the end wall 51 and the cooperating end of the valve spool 49 to move the valve spool 49 against the bias of spring 53 to the other or second operated position which is shown in FIG. 2. Conduit 57 is connected between the orifice 56 and the reservoir 55 to permit fluid to drain from that end of the valve bore 48 to permit the valve spool 49 to return to the first position under the bias of spring 53. Thus the orifice 56 in restricting fluid flow permits a controlled passage of pressure fluid to prevent hydraulic locking of the valve spool 49 between the first and second operated positions in valve bore 48. The valve spool 49 is formed to have two lands 59 and 60 separated by a reduced section or annular groove 61. The valve bore 48 is provided with three annular grooves 62, 63 and 64. The annular grooves 62, 63 and 64 and the lands 59 and 60 of the valve spool 49 are so positioned that in the first position of the valve, that in which the valve spool 49 abuts the shoulder 52, annular groove 64 is connected in free fluid communication with annular groove 63 by the reduced section 61 of the valve spool 49, and annular groove 62 is blocked by the land 59 of valve spool 49; and so that when the valve spool 49 is moved to the second position, that wherein the valve spool is moved toward end wall 50 until the coil spring 53 is substantially completely compressed, the land 60 will first block annular groove 64 after which the annular groove 62 will be connected in free fluid communication with annular groove 63 by the reduced section 61 of valve spool 49. Annular groove 62 is connected through the valve body 47, at what is described in the claims as the first port, to conduit 42. Annular groove 63 is connected through the valve body 47, at what is described in the claims as the third port, to conduit 46, and annular groove 64 is connected through the valve body 47, at what is described in the claims as the second port, to conduit 45.

Valve 43 further includes four one-way check valves 66, 67, 68 and 69. Check valve 66 comprises a valve chamber 70 having a valve seat at the inner end thereof cooperating with a ball 71 and connected by passageway 72 to annular groove 62. The ball 71 is adjustably biased against the valve seat by the coiled spring 73 and the set screw 74 threaded into the outer end of the chamber 70. The valve chamber 70 is connected in free fluid communication with the reduced portion of the valve bore 48 at the end wall 51 by a passageway 75. Thus it may be seen that when the fluid pressure in conduit 42 and annular groove 62 attains a pressure sufficiently high enough to unseat the ball 71, hydraulic fluid will flow from conduit 42, through passageway 72, through valve chamber 70, and passageway 75 to the reduced section of the valve bore 48 at end wall 51.

The one-way valve 67 is substantially identical in construction to that of valve 66, having a valve chamber 77 with its inner end connected to passageway 78, and a ball 79 biased to close the end of passageway 78 by a coiled spring 80, the bias of which is adjusted by the set screw 81 threaded into the outer end of valve chamber 77. Valve chamber 77 is also connected in free fluid communication with the reduced section of the valve bore 48 at the end wall 51 and this is accomplished by a passageway 82 formed through the valve body 47. The check valves 68 and 69 are both carried in the other end of passageway 78. Check valve 68, which comprises a ball 83 and compressed coiled spring 84, is connected to annular groove 63 and the port connected to conduit 46 by passageway 85. Check valve 68 prevents any hydraulic fluid in passageway 78 from flowing into conduit 46 and annular groove 63 but permits substantially free fluid flow in the opposite direction. Check valve 69 comprises ball 87 and compressed coiled spring 88. The check valve 69 is connected to annular groove 64 by a short unnumbered passageway. Check valve 69 will operate to prevent any hydraulic fluid flow from passageway 78 into annular groove 64 but will permit substantially free hydraulic fluid flow in the opposite direction.

Turning next to a detailed description of the operation of the present invention in order that the construction thereof may be more readily understood, continued reference is made to the drawings. Assuming first that hydraulic fluid of a relatively low pressure, or of a pressure not sufficiently high to operate either of the check valves 66 or 67, is directed through the valve as shown in the solid lines of FIG. 1, and that conduit 42 is connected to a device applying hydraulic fluid under pressure to conduit 42. As long as the hydraulic fluid flow from conduit 45 through the valve into conduit 46 is of a relatively low pressure and the pressure in conduit 42 is not relatively high, the fluid flow shown in FIG. 1 will remain. However, should the fluid pressure in conduit 42 rise to that for which the check valve 66 is set, the ball 71 will be unseated and hydraulic fluid will then flow through passageway 72, check valve 66, chamber 70, passageway 75 and into the reduced section of the valve bore 48 at end wall 51. This hydraulic fluid under pressure operating against the end of the valve spool 49 will move the valve spool 49 compressing the coiled spring 53. The first action of the valve spool 49 will be a blocking of the conduit 45 by the land 60. Further operation will interconnect conduits 42 and 46. The valve 43 will then be positioned as shown in FIG. 2, and the hydraulic fluid flow will be that shown by the solid line arrows of FIG. 2. In the present invention the valves 66 and 67 are so adjusted that the force required to unseat valve 67 is substantially less than that required to unseat valve 66. A pressure setting for valve 67, which is about one half of that for which valve 66 is set, has been found satisfactory. Since there is an immediate fluid pressure drop in passageway 72 when conduit 42 is interconnected with conduit 46, check valve 66 will close. However, before valve 66 can close, the hydraulic fluid under pressure will in flowing through passageway 85 open check valve 68 and valve 67 to admit hydraulic fluid through passageway 82 into the reduced section of the valve bore 48 at the end wall 51 to maintain the valve 43 in the position shown in FIG. 2. Check valve 69 will function to prevent any hydraulic fluid in passageway 78 from flowing into annular groove 64 which is connected to conduit 45. In this manner the valve 43 will operate positively and without chatter to maintain the flow shown in FIG. 2 until the fluid pressure in conduit 46 drops below that for which check valve 67 is set. If valve 67 closes, the fluid in the valve bore 48 at the end wall 51 will drain off through the orifice 56, permitting the spring 53 to return the valve spool 49 to a position such as shown in FIG. 1, and switching the flow from conduit 42 to conduit 45 through the valve and into conduit 46.

Assuming next that the path of fluid flow is such as shown by the dotted line arrows of FIG. 1, in other words from conduit 46 through the valve 43 and into conduit 45. Assuming further that the loading on the hydraulic fluid in conduit 45 is increased to cause a substantial rise in the hydraulic fluid pressure therein. This hydraulic fluid pressure will be applied in the valve 43 to the check valves 68 and 69. As these valves open the hydraulic fluid pressure, when higher than that for which valve 67 is set, will cause valve 67 to operate, the ball 79 being unseated to permit hydraulic fluid to flow therethrough and through passageway 82 to the reduced section in the valve bore 48 at the end wall 51. This hydraulic fluid under pressure in the valve bore 48 will cause valve spool 49 to be moved to the position shown in FIG. 2 with a consequent fluid flow such as shown in the dotted line arrows in FIG. 2. As the valve spool 49 is moved to the position such as shown in FIG. 2, annular groove 64 is blocked from fluid communication with annular groove 63 before annular grooves 62 and 63 are placed in free fluid communication. The continued relatively high pressure of the hydraulic fluid in conduit 45 will continue to be applied about land 60 of valve spool 49 and through check valve 69 to valve 67 maintaining hydraulic fluid pressure on the end of the valve spool 49. This described circuit maintaining the spool 49 in the position shown in FIG. 2 will overcome the effect of any momentary pressure drop in conduit 46 when conduits 42 and 46 are interconnected through the valve bore 48, which momentary pressure drop will close valve 68. The valve will remain operated to the position shown in FIG. 2 until the hydraulic fluid pressure in conduit 45 drops below that necessary to maintain valve 67 operated. Valve 67 will then close and valve spool 49 will return to the position shown in FIG. 1 under the bias of the coil spring 53 as the fluid gradually passes through the orifice 56 to the reservoir 55.

Having described the invention, what is considered new and desired to be protected by Letters Patent is:

1. A hydraulic fluid valve comprising a valve body having a valve bore formed therein, one end of said bore having a closed wall with an orifice formed therethrough, an annular shoulder formed in said valve bore a spaced distance from said one end thereof, three hydraulic fluid ports formed through said valve body into said valve bore between said annular shoulder and the other end of said valve bore in a spaced-apart relationship to each other, said valve spool comprising a pair of land portions separated by an annular groove, said valve spool slidably carried in said valve bore between said shoulder and said other end of said valve bore, the end of said valve spool and said valve bore at said one end thereof defining a chamber, said valve spool and said three ports being formed so that the first of said ports is blocked by one of said lands and the second and third ports are connected in free fluid communication through said valve bore and about said annular groove when said valve spool abuts said shoulder, and so that said second port is blocked by the other of said lands and said first and third ports are connected in free fluid communication through said valve bore and about said annular groove when said valve spool is moved away from said shoulder to a second position, a compressed spring disposed in said valve bore between said other end of said valve bore and the other end of said valve spool for biasing said valve spool to the first position against said shoulder, first adjustable check valve means formed in said valve body and connected between said first port and said chamber and operating responsive to hydraulic fluid pressures in said first port above a certain predetermined pressure to admit hydraulic fluid to said chamber, said orifice permitting a predetermined amount of said admitted hydraulic fluid to be released from said chamber, the remaining amount of said admitted fluid producing a force on said one end of said valve spool to move said valve spool to said second position greater than the biasing force exerted by said compressed spring on said other end of said valve spool, second adjustable check valve means formed in said valve body and connected between a passageway and said chamber, said second adjustable check valve means being formed to operate responsive to fluid pressures in said passageway below said certain predetermined pressure to admit second hydraulic fluid to said chamber, said orifice permitting a predetermined amount of said second admitted hydraulic fluid to be released from said chamber, the remaining amount of said second admitted fluid producing a force on said one end of said valve spool greater than said opposing force of said spring on the other end but less than the force produced by said first admitted fluid, said orifice further providing passage of said first and second admitted fluids when said first and second check valve means become non-responsive to fluid pressures in said first port and said passageway so that said valve spool is moved to said shoulder by the force of said spring and not hydraulically locked between said second position and said shoulder, and third check valve means connected between said third port and said passageway, fourth check valve means connected between said second port and said passageway, said third and fourth check valve means being formed to permit fluid to flow into said passageway from said third and second ports, respectively.

2. A hydraulic fluid valve comprising a valve body having a bore formed therein, three hydraulic fluid ports formed through said valve body into said valve bore in a spaced-apart relationship to each other, a valve spool slidably carried in said valve bore and slidable to a first position to block the first port and interconnect said second and third ports in free fluid communication and slidable to a second position to block said second port and interconnect said first and third ports in free fluid communication, a resilient means disposed in said valve bore at one end and biasing said valve spool to said first position, an outlet opening formed at the other end of said valve bore, adjustable check valve means formed in said valve body and connected between said first and third valve ports and said valve bore at said other end thereof, said adjustable check valve means operating responsive to any fluid pressure in said first valve port above a certain predetermined pressure for admitting hydraulic fluid under pressure to said other end of said valve bore, and said adjustable check valve means operating responsive to any hydraulic fluid pressure in said third port above a second certain predetermined fluid pressure for admitting hydraulic fluid under pressure to said other end of said valve bore, said outlet opening providing passage of a controlled amount of admitted hydraulic fluid above said first and second predetermined pressures from said other end of said bore so that a remaining amount of said hydraulic fluid provides a fluid force acting on said valve spool in said first position to exceed the force of said resilient means and thereby said valve spool is slidable to said second position to compress said resilient means, and said opening further providing passage of said hydraulic fluid to prevent hydraulic locking of said valve spool in said second position when said fluid pressure falls below said predetermined pressures for admittance by said adjustable check valve means whereby said valve spool is slidable from said second position to said first position by said resilient force.

3. A hydraulic fluid valve comprising a valve body having a bore formed therein, three hydraulic fluid ports formed through said valve body into said valve bore in a spaced-apart relationship to each other, a valve spool slidably carried in said valve bore and slidable to a first position to block the first port and interconnect said second and third ports in free fluid communication and slidable to a second position to block said second port and interconnect said first and third ports in free fluid communication, a resilient means disposed in said valve bore at one end and biasing said valve spool to said first position, an outlet opening formed at the other end of said valve bore, adjustable check valve means formed in said valve body and connected between said first and third valve ports and said valve bore at said other end thereof, said adjustable check valve means operating responsive to any fluid pressure in said first valve port above a certain predetermined pressure for admitting hydraulic fluid under pressure to said other end of said valve bore, and said adjustable check valve means further operating responsive to any hydraulic fluid pressure in said third port above a second certain predetermined fluid pressure for admitting hydraulic fluid under pressure to said other end of said valve bore, said outlet opening providing passage of a controlled amount of said hydraulic fluid above said first and second predetermined pressures from said other end of said bore so that a remaining amount of said hydraulic fluid provides a fluid force acting on said valve spool in said first position to exceed the force of said resilient means and thereby said valve spool is slidable to said second position to compress said resilient means, and said opening further providing passage of said hydraulic fluid to prevent hydraulic locking of said valve spool from said first position when said fluid pressure falls below said predetermined pressures for admittance by said adjustable check valve means whereby said valve spool is slidable from said second position to said first position by said resilient force, and further check valve means preventing any fluid interchange directly between said second and third valve ports.

4. A hydraulic fluid valve comprising a valve body having a bore formed therein, one end of said bore having a closed wall with an outlet opening formed therethrough, an annular shoulder formed in said valve bore a spaced distance from said one end thereof, three hydraulic fluid ports formed through said valve body into said valve bore between said annular shoulder and the other end of said valve bore in a spaced-apart relationship to each other, a valve spool comprising a pair of land portions separated by an annular groove, said valve spool slidably carried in said valve bore and slidable to a first position to block the first port with one of said portions and interconnect said second and third ports with said annular groove in free fluid communication and slidable to a second position to block said second port with the other of said land portions and interconnect said first and third ports with said groove in free fluid communication, a resilient means disposed in said valve bore at said other end and biasing said valve spool to said first position against said shoulder, adjustable check valve means formed in said valve body and connected between said first valve port and said valve bore between said shoulder and said one end of said valve bore, said adjustable check valve means operating responsive to any fluid pressure in said first valve port above a certain predetermined pressure for admitting hydraulic fluid under pressure to said one end of said valve bore, said outlet opening providing passage of a controlled amount of hydraulic fluid above said first predetermined pressure from said one end of said bore so that a remaining amount of said hydraulic fluid provides a fluid force acting on said valve spool at the other of said land portions in said first position to exceed the force of said resilient means and thereby said valve spool is slidable to said second position to compress said resilient means, and said opening further providing passage of said hydraulic fluid to prevent hydraulic locking of said valve spool from said first position when said fluid pressure falls below said predetermined pressure for admittance by said adjustable check valve means whereby said valve spool is slidable from said second position to said first position by said resilient force.

5. In a hydraulic fluid valve as claimed in claim 4, wherein second check valve means is formed in said valve body and connected between said third port and said valve bore between said shoulder and said one end of said valve bore, said second check valve means being adjusted to open at fluid pressures below said certain predetermined pressure and above the effective pressure exerted by said resilient means to admit hydraulic fluid into said one end of said valve bore to maintain said valve spool in said second position when said valve spool is moved to said second position responsive to the operation of said first adjustable check valve means and said opening further providing passage of said hydraulic fluid to prevent hydraulic locking of said valve spool from said first position when said fluid pressure falls below the admittance pressure by said second check means whereby said valve spool is slidable from said second position to said first position.

6. A hydraulic fluid valve comprising a valve body having a bore formed therein, three hydraulic fluid ports formed through said valve body into said valve bore in a spaced-apart relationship to each other, a valve spool slidably carried in said valve bore and slidable to a first position to block the first port and interconnect said second and third ports in free fluid communication and slidable to a second position to block said second port and interconnect said first and third ports in free fluid communication, a resilient means disposed in said valve bore at one end and biasing said valve spool to said first position, an outlet opening formed at the other end of said valve bore, adjustable check valve means formed in said valve body and connected between said first and third valve ports and said valve bore at said other end thereof, said adjustable check valve means operating responsive to any fluid pressure in said first valve port above a certain predetermined pressure for admitting hydraulic fluid under pressure to said other end of said valve bore, and said adjustable check valve means further operating responsive to any hydraulic fluid pressure in said third port above a second certain predetermined fluid pressure, said outlet opening providing passage of a controlled amount of hydraulic fluid above said first and second predetermined pressures from said other end of said bore so that a remaining amount of said hydraulic fluid provides a fluid force acting on said valve spool in said first position to exceed the force of said resilient means and thereby said valve spool is slidable to said second position to compress said resilient means, and said opening further providing passage of said hydraulic fluid to prevent hydraulic locking of said valve spool from said first position when said fluid pressure falls below said predetermined pressures for admittance by said adjustable check valve means.

7. A hydraulic valve comprising a valve body having a bore formed therein, three ports formed through said valve body into said valve bore in a spaced-apart relationship to each other, a valve means slidably carried in said valve bore, a resilient means in said valve bore between one end of said bore and said valve means, said resilient means urging said valve means toward the other end of said bore for blocking said first port and interconnecting said second and third ports in free fluid communication when fluid pressures are below a certain predetermined value in said ports, a passageway formed in said valve body in cooperation with said first port and said valve bore at said other end thereof, a second passageway formed in said valve body in cooperation with said third port and said other end of said valve bore, said passageways cooperating to provide admittance of pressure fluid from said first and third ports between said other end of said valve bore and said valve means, an outlet opening in said valve bore at said other end providing passage of a controlled amount of said admitted pressure fluid from said passageways, a remaining amount of said admitted pressure fluid above a certain predetermined value providing a fluid force acting on the other end of said valve means greater than the opposing force of said resilient means so that said valve means is slidable toward said one end of said valve bore to block said second port and to interconnect said first and third ports in free fluid communication, said valve means to slidably move toward said other end of said valve bore when said admitted pressure fluid from said passageways is below said certain value and below effective pressure of said resilient means, said opening further providing passage of pressure fluid to prevent said slidable valve from being hydraulically locked from said one end to said other end of said valve bore.

8. A hydraulic valve comprising a valve body having a bore formed therein, three ports formed through said valve body into said valve bore in a spaced-apart relationship to each other, a valve means slidably carried in said valve bore, a resilient means in said valve bore between one end of said bore and said valve means, said resilient means urging said valve means toward the other end of said bore for blocking said first port and interconnecting said second and third ports in free fluid communication when fluid pressures are below a certain predetermined value in said ports, a passageway formed in said valve body in cooperation with said first port and said valve bore at said other end thereof, said passageway cooperating to provide admittance of pressure fluid from said port between said other end of said valve bore and said valve means, an outlet opening in said valve bore at said other end providing passage of a controlled amount of said admitted pressure fluid from said passageway, a remaining amount of said admitted pressure fluid above a certain predetermined value providing a fluid force acting on the other end of said valve means greater than the opposing force of said resilient means so that said valve means is slidable toward said one end of said valve bore to block said second port and to interconnect said first and third ports in free fluid communication, said valve means to slidably move toward said other end of said valve bore when said admitted pressure fluid from said passageway is below said certain value and below effective pressure of said resilient means.

References Cited in the file of this patent
UNITED STATES PATENTS

| | | |
|---|---|---|
| 2,420,394 | Gilman | May 13, 1947 |
| 2,682,880 | Ozmina | July 6, 1954 |